United States Patent [19]

Littrell

[11] 4,452,613

[45] Jun. 5, 1984

[54] VERTICAL MEDIA BED FILTER AND METHOD OF CLEANING FILTER PANELS

[75] Inventor: Denis G. Littrell, Anchorage, Ky.

[73] Assignee: Rexnord Inc., Milwaukee, Wis.

[21] Appl. No.: 348,882

[22] Filed: Feb. 16, 1982

[51] Int. Cl.³ .................... B01D 46/04; B01D 46/34
[52] U.S. Cl. ........................................ 55/96; 55/98;
55/273; 55/283; 55/287; 55/300; 55/432;
55/474; 55/479; 34/85; 34/174
[58] Field of Search ............... 55/79, 96, 98, 99, 161,
55/162, 273, 283, 286, 287, 291, 300, 303, 350,
431, 433, 474, 479, 282; 34/11, 85, 174

[56] References Cited

U.S. PATENT DOCUMENTS

| | | | |
|---|---|---|---|
| 1,549,680 | 8/1925 | Nordström | 55/282 |
| 3,594,991 | 7/1971 | Berz et al. | 55/302 |
| 3,868,237 | 2/1975 | Berz | 55/287 |
| 3,871,846 | 3/1975 | Berz et al. | 55/474 |
| 3,917,472 | 11/1975 | Berz | 55/282 |
| 4,000,995 | 1/1977 | Morris | 55/282 |
| 4,012,210 | 3/1977 | Morris | 55/479 |
| 4,078,041 | 3/1978 | Morris | 55/2 |
| 4,132,536 | 1/1979 | Andersen | 55/97 |
| 4,203,736 | 5/1980 | Berz | 55/291 |
| 4,300,921 | 11/1981 | Littrell | 55/96 |

Primary Examiner—David L. Lacey
Attorney, Agent, or Firm—John M. Neary; Vance A. Smith

[57] ABSTRACT

A vertical media bed dust collector in which the media bed of a filter panel is rejuvenated when necessary by interrupting the gas flow through the panel, withdrawing the filter media from the panel, separating the agglomerated dust from the filter media, returning the filter media to the filter panel, and reestablishing the gas flow through the panel. The system further includes apparatus for removing collected dust from the separating and recirculating surfaces of the media handling apparatus and also from the remote face of the filter panels before the cleaned gas is allowed to pass out of the collector so that the cleaned gas is not recontaminated by small amounts of dust adhering to those surfaces.

7 Claims, 6 Drawing Figures

VERTICAL MEDIA BED FILTER AND METHOD OF CLEANING FILTER PANELS

BACKGROUND OF THE INVENTION

The present invention relates to a granular bed filtering arrangement, and more particularly to a granular bed system for filtering and collecting particulate matter of very small size (referred to hereinafter as "dust") from gaseous streams. The invention also pertains to a process of separating entrained dust from a gaseous stream, and for periodically cleaning the granular bed filter media in an automatic apparatus for performing a process which separates the dust from the filter media and collects the dust in a suitable container for disposal or recovery of materials. The granular bed filter media is also variously referred to as filter medium and granular material.

Granular bed filters have been used extensively to collect the dust from hot process exhaust systems. One type of granular bed filter used for this purpose is exemplified by those illustrated in Berz, U.S. Pat. Nos. 3,868,237 and 3,871,846. In such a filter, the dust-contaminated exhaust gas, after flowing through a cyclone separator, flows downwardly through a horizontally arranged granular filter bed in which the dust is entrapped. When the bed becomes dustladen, a backflush gas is blown upwardly through the bed to dislodge the collected dust, preferably in agglomerated chunks, and carry it into the cyclone for separation from the backflush gas. The backflush gas from the cyclone outlet rejoins the contaminated gas stream and thence to another granular bed filter of the system for cleaning.

Granular bed filters of this type which employ a stationary bed and a backflushing step operate very satisfactorily for many applications, for example, in cleaning exhaust gas streams from cement manufacturing plants. However, this type of system also possesses certain inherent disadvantages which limit its application. For example, such a system is generally not suitable for separation of sub-micron particle sizes, since the granular filter bed material needed for sub-micron filtering must have a very fine mesh size which precludes effective backflushing because the fine bed particles themselves become entrained in the backflush gas and are blown out of the bed during backflushing. It is impractical to simply increase the thickness of the bed, since this increases the pressure drop across the bed and results in an unacceptable increase in the operating costs for the system. Another limitation of this type of system is that it is capable of removing from the system only the dust which is agglomerated into chunks large enough to be separated by the cyclone. The non-agglomerated dust tends to simply build up in the system and ultimately requires some measure to remove it.

Another commercially available granular bed filter, e.g., of the type shown in U.S. Pat. No. 4,017,278 to Reese, employs a vertically contained granular bed which is generally continuously moving. This type of system obviates the need to have separate cleaning or backflushing phases. The movement of the bed, however, is a disturbing influence which interferes with the collection of the dust in the granular bed which would otherwise occur if the entire bed were quiescent. In addition, the granules at the extreme outer edges of the filter chamber do not travel vertically downward, as does the interior of the bed, because the constant refill does not allow a drain space between the louvers of the filter walls. External dedusting of the granular material removes the separated dust from the system.

U.S. Pat. No. 4,300,921, issued Nov. 17, 1981, by the common inventor of the present invention and assigned to common assignee as the present invention provides an improved granular bed filter arrangement of the vertical type that can be employed economically to separate sub-micron dust particle sizes from a contaminated gas stream. Briefly, the device as described therein comprises a generally gas-tight containment vessel; a gas inlet for introducing the dust containing gaseous stream into the central portion of the vessel; a plurality of generally vertically oriented filter panels arranged circumferentially about the central portion of the vessel, these filter panels being adapted for receiving a bed of granular material as a filter media; a separate clean gas outlet associated with each of the filter panels, thereby defining a plurality of gas flow paths from the central portion of the vessel through each of the respective filter panels to the clean gas outlet associated with each of the filter panels. Thus the dust contained in the gas flowing through each filter panel becomes trapped in the granular filter media. Additionally, a means is provided which selectively closes each of the clean gas outlets, generally in a sequential order, to temporarily decrease the number of independent gas flow paths. Above the panels and within the vessel is a feed hopper which selectively supplies granular filter media to each of the filter panels. The panels each have a gate means which selectively empties each of the filter panels of granular filter media in response to a signal. Centrally positioned beneath the vessel is a separator which separates trapped particulate material from the granular filter media emptied from the filter panels. A conveying means communicates with the separator and conveys separated granular filter media from the separating means to the feed hopper. The separators ordinarily comprise a plurality of surfaces, preferably substantially concentrically arranged, inverted truncated conical plates, positioned below the discharge point of the means for emptying each of the filter panels of granula filter media. The surfaces are sufficiently hard that the granular filter media will bounce upon impact with the surfaces due to the force of gravity. The surfaces are inclined with respect to the vertical and are spaced from one another both vertically and horizontally in such a way that granular filter media discharged thereon will cascade downwardly from surface to surface whereas the agglomerated dust particles accompanying the granular filter media will far through the horizontal spaces between the surfaces.

It has been noted that the movement of the media due to the discharging and charging cycle in a filter device of the type described in the aforementioned commonly assigned application leaves a certain amount of airborne, very fine residual dust which becomes trapped on the clean side of a filter panel after it has been charged. When the newly charged filter panel is returned to operation, the residual dust is moved through the gas outlet to the atmosphere by the gas passing through the filter panel. Generally, the very fine dust presents no problem, but in installations where high percentage filtering is required due to environmentally sensitive concerns, the venting of residual dust to the atmosphere may require additional filtering. This, of course, is an additional expense and could well increase energy requirements for operating the filter system.

It is therefore a paramount object of the present invention to provide an improved filter system in which fine dust can be filtered without a significant concurrent increase in cost and energy requirements.

It is another object of the present invention to provide an improved vertical bed filter arrangement in which residual dust is removed prior to the return to service of the associated filter panel.

Yet another object of the invention is to provide an improved vertical bed granular media, dust filter system having means for recirculating and cleaning the media and providing a means of capturing the residual dust from the media canister.

Still another object of the present invention is to provide a means of circulating a gas stream to continually vent the housing surrounding the means for recirculating the media, for example, a bucket elevator system, back to the filter panels.

A further object of the present invention is to provide a means for enhancing the efficiency of the means for separating the dust from the discharged media by use of a gas stream.

BRIEF SUMMARY OF THE PRESENT INVENTION

The present invention is applicable to granular bed filters of the vertical type. Briefly such filters have an array of panels forming a gradually gas-tight container, each panel being charged with a granular filter media adapted to filter small contaminating dust particles from a stream of gas flowing through the media. Such gas is introduced through a contaminated gas inlet into a central plenum enclosed by the inside faces of the panels and evacuated along gas paths leading from exhaust plenums on the outside faces of the panel, remote from the central plenum, through a clean gas outlet. In a preferred sequence, the media in the various filter panels is removed after becoming clogged with dust particles filtered from the gas. The granular filter media is cleaned, i.e. the filter media granules are separated from the dust particles, in a particle separating means, and is returned via a media recirculating means to a storage hopper, preferably above the filter panels. A gate below the hopper opens to recharge the empty panel with cleaned media from the hopper.

The improved filter device of the present invention provides a valving and gas path arrangement in thea above defined filter, acting in conjunction with a control means, to promote (1) cleaning the housing enclosing the media recirculating means by removing residual dust particles carried by the recirculating granular filter media, (2) enhancing the separation of filter media granules from dust particles within the separating means, and (3) removing the residual dust particles on the clean gas side of the filter panels prior to the panel being placed back in operation. The gas path arrangement includes, a main contaminated gas entry path, a clean gas path leading from the exhaust plenum on the remote or clean side of each panel to the clean gas outlet, a first gas path leading from the exhaust plenum of each panel to an evacuation gas path, and a second gas path leading from a source of ambient air to the evacuation gas path. The evacuation gas path includes and is partially defined by the separating means, the housing of the recirculating means, an evacuation gas cleaner means, and an air moving means such as an induction fan.

In a first mode the flow of contaminated gas through a filter panel to be discharged is interrupted. Simultaneously, ambient air is blown through the second gas path into the evacuation gas path to sweep out residual small dust particles loosened by the action of media moving through the separator on the way back to the media hopper via the recirculating means. The ambient air stream moves in a direction counter to the movement of the media through the separating means, thereby enhancing its "dedusting" effect since some small particles that would otherwise remain with the media are removed. The amount of small dust particles in the ambient air stream is reduced by an evacuation gas cleaner; the air is vented back into the contaminated gas inlet, and the dust is collected for disposal.

The second mode of operation occurs when clean media is recirculated back into an empty panel. During recharging of the empty panel, the agitation of the granular filter media loosens a small amount of free dust and also stirs up some of the residual dust left in the panel surfaces when the contaminated media was removed. Upon recharging, the ambient air flow through the second gas path is shut off, and circulation is established from the exhaust plenum through the evacuation gas line. The residual dust loosened during panel recharging is swept into the evacuation gas line and eventually back to the contaminated gas inlet after being cleaned in the evacuation gas cleaner. A closed cycle is thus established for the residual dust to prevent it from being vented to the atmosphere.

After a predetermined time interval during which the loosened residual dust is purged from the recharged filter panel and exhaust plenum, the filter panel is placed back into operation and the cleaned gas is vented as before into the clean gas outlet. In this third or operative mode the ambient air source is isolated from the flow of clean gas to prevent back flow. The three mode cycle is repeated in any order but preferably in a sequentially predetermined time interval following the cleaning of the other panels.

DESCRIPTION OF THE DRAWINGS

The invention and its many attendant objects and advantages will be better understood upon reading the following description of the preferred embodiment in conjunction with the following drawings, wherein.

DETAILED DESCRIPTION OF THE PREFERRED EMBODIMENTS

Figure 1:
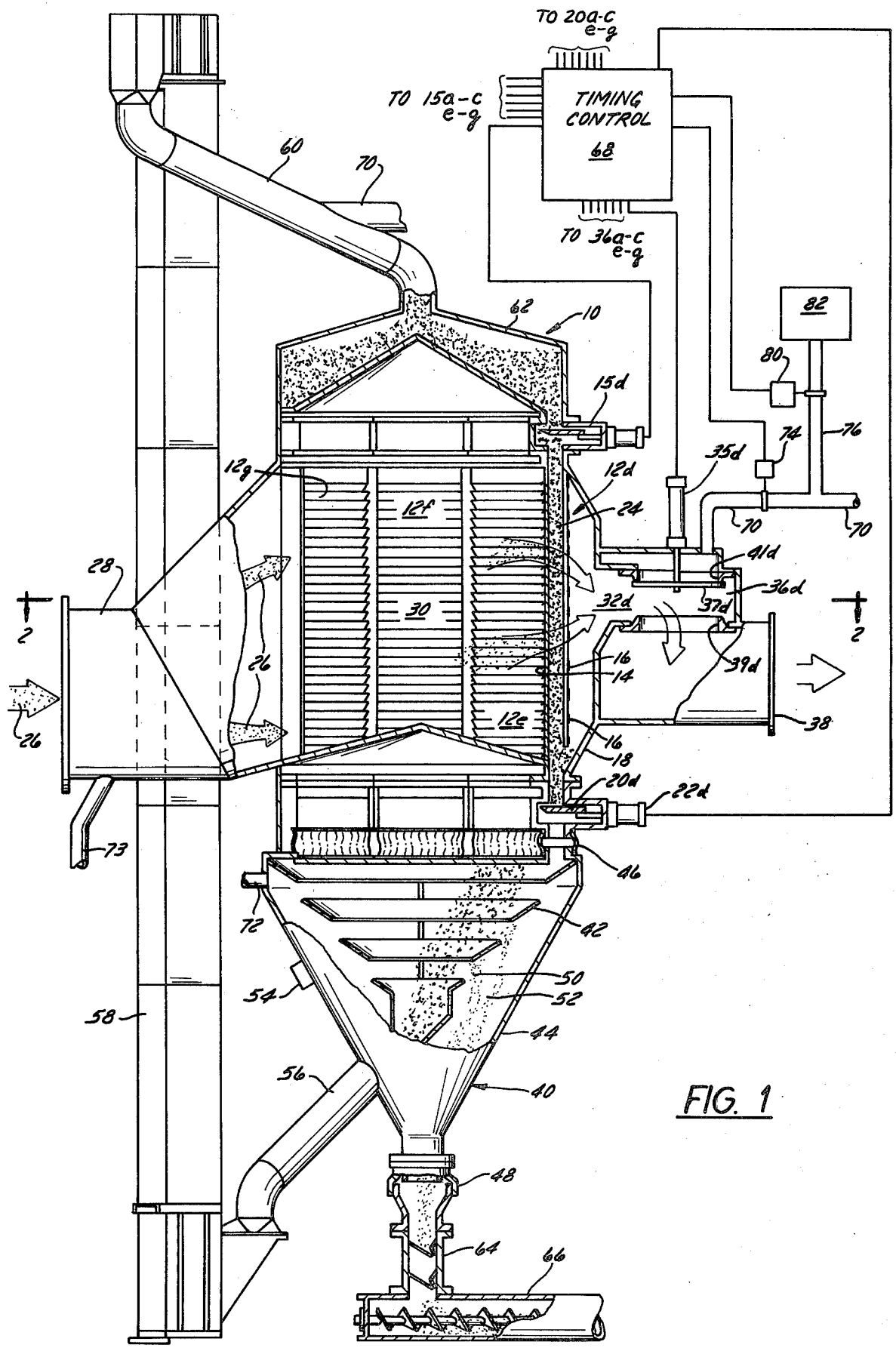
FIG. 1 is an elevation, partly in section, of a vertically contained granular bed gas filter system having a valving and gas path arrangement according to the invention.
Figure 2:
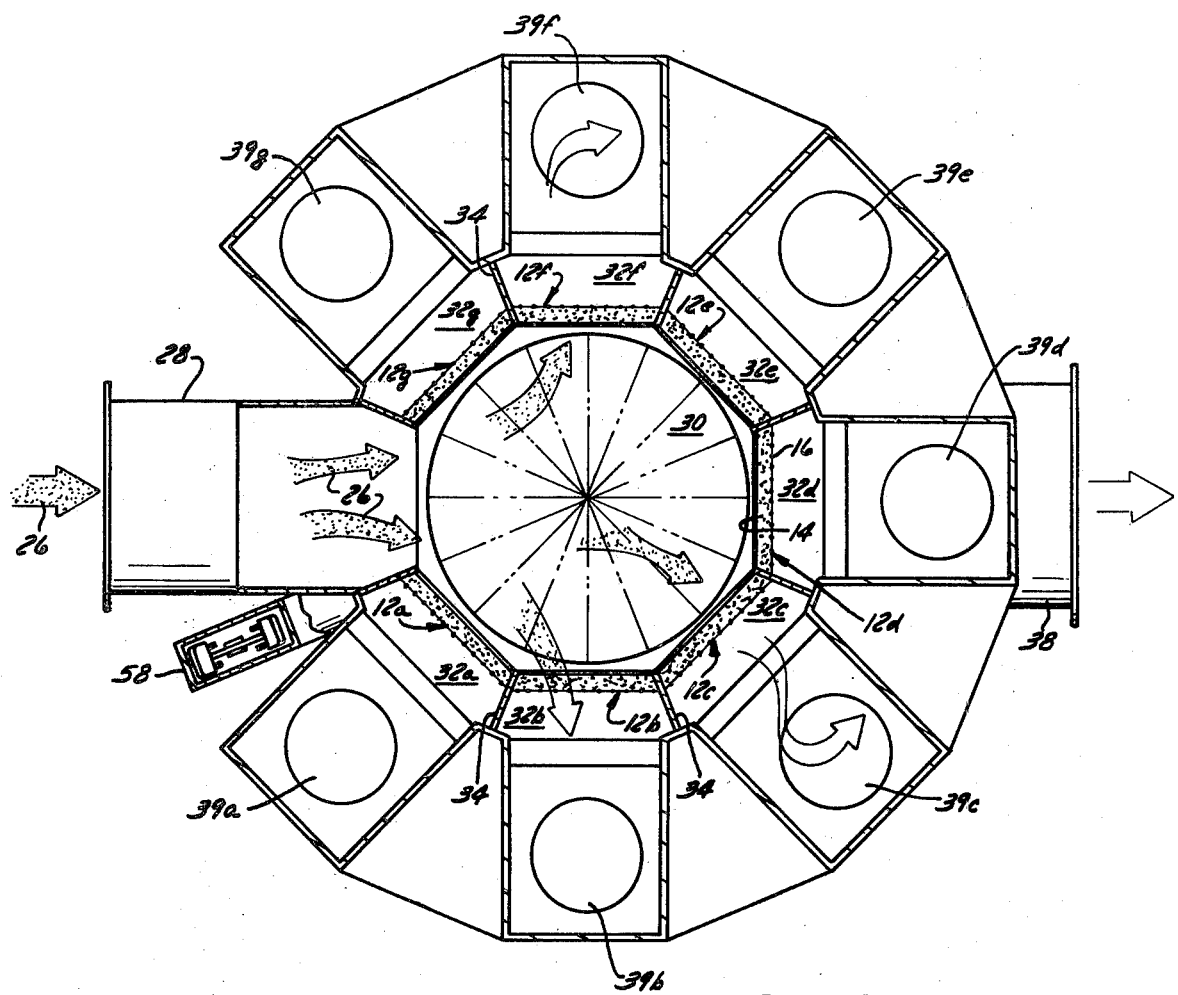
FIG. 2 is a sectional plan along lines 2—2 in FIG. 1.

FIGS. 1 and 2 demonstrate one environment in which the present invention was intended to be often employed. As illustrated, a filter module 10 comprises a number of filter panels 12a–g which are preferably arranged to be positioned substantially vertically as, for example, the sides of a regular prism. Each panel comprises a louvered wall 14 facing toward the interior of the prism (contaminated gas side), and a second wall 16, also pervious to gas, held spaced from the first wall 14 and facing the exterior of the prism (clean gas side). A granular filter medium 24 fills the space between walls 14 and 16 for filtering dust particles from a gas stream flowing through the filter panels 12a–g. The second wall 16, is preferably a porous screen having openings or interstices which permit passage of a gas but retain the granular filter material, thus permitting the use of fine granules and high gas flow rates.

The panels are mounted in a substantially gas-tight shell or housing 18. Exits at the bottom of the housing 18 below each panel are closed by slide gates 20a–g which may be opened or closed by operators 22a–g such as linear motors or a hydraulic actuators. The gates are preferably vertically aligned with the space between the louvered wall 14 and the gas pervious wall 16.

The granular filter medium 24 in the space between walls 14 and 16 may be various types of granular material, such as sand, gravel, fractured steel shot, or other granular materials or mixtures thereof conventionally used as filter media in granular filter beds. The type of material employed depends upon the application in which the filter module 10 is to be used.

Contaminated gas to be cleaned, represented by arrow 26, enters through a contaminated gas inlet 28 leading into a centrally-located central plenum 30 enclosed by the louvered walls 14 of panels 12a–g. From the central plenum 30, the gas flows radially outwardly through the louvered walls 14, the granular filter media 24 in filter panels 12a–g, and the gas pervious walls 16 into exhaust plenums 32a–g outside the wall 16 and inside the housing 18. Partitions 34 separate chambers 32a–g so that two way or OR valves 32a–g associated respectively with each chamber and separately controlled by actuators 35a–g may separately control the flow of gas through each filter panel. While passing through the granular filter media 24, a very high percentage of the dust or solid particles entrained in the gas is deposited on the surfaces of the granular filter media in the filter panels 12a–g.

The path of the gas through the several filter panels is shown more clearly in FIG. 2. As shown, the contaminated gas enters through the inlet 28 which leads directly to the central plenum chamber 30 shown surrounded by a plurality of filter panels 12a–g and an open side serving as an entrance from the inlet 28. After passing through walls 14 and 16, exhaust plenums 32a–g, and OR valves 36a–g, the cleaned gas flows through a clean air outlet 38.

As the dust collects on the granules in one of the filter beds, the pressure drop through the bed increases and eventually the granular material must be cleaned or dedusted, i.e., the dust particles must be removed from the granular filter media 24. When, for example, bed 12d is to be dedusted, OR valve 36d is operated by actuator 35d in response to a first signal from a control means, such as timing control unit 68 to close the valve member 37d against the lower valve seat 39d to shut off the flow of clean gas through the clean gas path to the clean gas outlet 38. The other gas path, known as the "first gas path", from the two-way valves 36d leads through a valve 74 to an evacuation gas path, but although the upper valve seat 41d from the valve 36d is open, the valve 74 is closed, so the flow of gas through the panel 12d is interrupted. The slide gate 20d opens to dump the granular filter media 24 onto a separating means or deduster unit 40 located below housing 18.

The dedusting unit may comprise any conventional deduster, such as a vibrating screen-type unit. It is preferred, however, to employ a dedusting unit of the type described and claimed in commonly assigned U.S. Pat. No. 4,300,921 which is based upon the principle that the filter media granules will bounce when they fall on hard surfaces, whereas the dust will not bounce. The hard surfaces are inclined with respect to the vertical and are spaced from one another both vertically and horizontally in such a way that the granular filter media will cascade downwardly from surface to surface whereas the dust will fall through the horizontal spaces between the surfaces. The surfaces may be formed of metal plates or any material sufficiently hard to provide the desired separation.

Referring again to FIG. 1, the dedusting unit is preferably comprised of a series of shallow funnels or inverted, truncated conical decks 42 enclosed in an inverted conical housing 44. The housing 44, which serves also as a receiver for dust and other particular material leaving the inclined surfaces at relatively slow speed, is connected through a flexible seal 46 to the lower end of the filter module housing 18. A second flexible seal 48 connects the bottom of the inverted conical housing 44 to a dust disposal system. The flexible seals allow vibration of the deduster by a vibrator 54 while maintaining a closed system. It will, of course, be understood that the decks 42 may have any other suitable shape, such as linear, polygonal, etc.

As the granular material 24 flows down through the gate 20d it falls onto the upper marginal area of the top deck 42. The discharge opening of each of the decks 42 does not extend radially or axially to the entrance of the next lower deck. In consequence, an annular gap 50 exists between the lower edge of one deck and the upper edge of the next lower deck. The decks are spaced vertically so that filter media granules may cascade axially downward and radially inward across the gap. The abrupt change in direction and impact as the granules impinge on the inclined surface knocks the dust 52 loose from the granules. The dust 52 slides down the inclined surface of the deck 42, and drops from the lower edge of the inclined surface through the gap 50, missing the rim of the next lower deck 42 and falling to the tapered end of the housing 44.

Any number of decks, e.g., 2, 3, 4, 5, 6 or more, may be employed. Most of the dust is removed between the first 2 or 3 decks, and the use of more than 5 or 6 decks does not produce significantly better dedusting in most circumstances. The movement of the dust down the inclined surfaces of the decks 42 and conical housing 44 may be promoted by vibration produced by one or more vibrators 54.

The angle of inclination of the decks 42 may be chosen at any value which provides sufficient momentum to the dust particles so that they will not build up on the deck surfaces and interfere with the bouncing action of the granular filter media. Otherwise, the angle of deck inclination can be chosen to coordinate with deck spacing to provide for proper cascade action of the granules, taking into consideration the amount of space available for the unit.

After cascading down the inclined surfaces of the decks 42, the granular material flows into a collection chute 56 and through the chute to the foot of a bucket elevator 58. The bucket elevator 58 lifts the granular material and dumps it through a second chute 60 to a storage hopper 62 formed in the upper part of the housing 18. From the hopper 62, the cleaned granules may be fed into any of the filter panels 12a–g by opening a one-way valve 15a–g, not all shown, associated with the respective filter panels 12a–g. Preferably, the hopper 62 has sufficient volume to permit immediate refilling of any filter panel from which all of the granular material has been drained for dedusting. Complete drainage of the filter panel prior to refill ensures drainage of all the spaces between the walls 14 and 16, including the louvers of the wall 14 and any other similar spaces where granular material may otherwise remain stagnant.

As mentioned, the dust 52 which is separated from the granules slides down the inclined surface of the inverted conical housing 44. The flow of dust from the housing 44 is controlled by an air lock 64 which permits withdrawal of the collected dust without admission of air into the dust disposal system. The air lock 64 leads to a screw conveyor 66 forming part of a dust disposal system.

The control means such as the timing control 68 is provided to control the operation of the valves 36a–g, the valves 74 and 80, and the media control slide gates 15a–g and 20a–g. The control 68 is an adjustable unit having a speed adjustable timing motor driving a rotating contact unit which establishes electrical continuity through the actuator circuits in a predetermined sequence for predetermined time periods. The sequence has been outlined above and will be explained in more detail below; the time periods will vary with the size of the unit, the concentration of the dust, and the dust particle size.

Valve 36d, for example, has two exit ports defined by lower valve seat 34d and upper valve seat 41d. The lower valve seat 39d leads to the clean gas outlet 38, and the upper valve seat 41d leads to an evacuation gas path, formed in part by a gas pipe 70 which can terminate either at the chute 60 as shown in FIG. 1, or into the bucket elevator housing shown in FIGS. 3a and 3b. Pipe 70 is continuous but is shown broken in FIG. 1 for purposes of clarity. The air passes upward through the chute 60, downward through the housing of the elevator 58, up through the chute 56 and into the housing 44. A second gas pipe 72, also broken for purposes of clarity, ultimately connects the housing 44 of the deduster 40 to a pipe 73 which terminates at the contaminated gas inlet 28. Pipe lines 70, 72 and 73 therefore establish a continuous evacuation gas path from valve 36d and counter current through the elevator 58 and the deduster 40 to inlet 28.

A valve 74 is positioned in the pipe 70 between a header 75 from the valves 36a–g and an ambient air pipe line 76 which intersects the pipe 70 at a junction 78. Pipe line 76 communicates through an air flow control valve 80 with an ambient source 82 of air or gas which may be, for example, a heating duct which preheats the ambient air to prevent condensation.

Figure 3B:
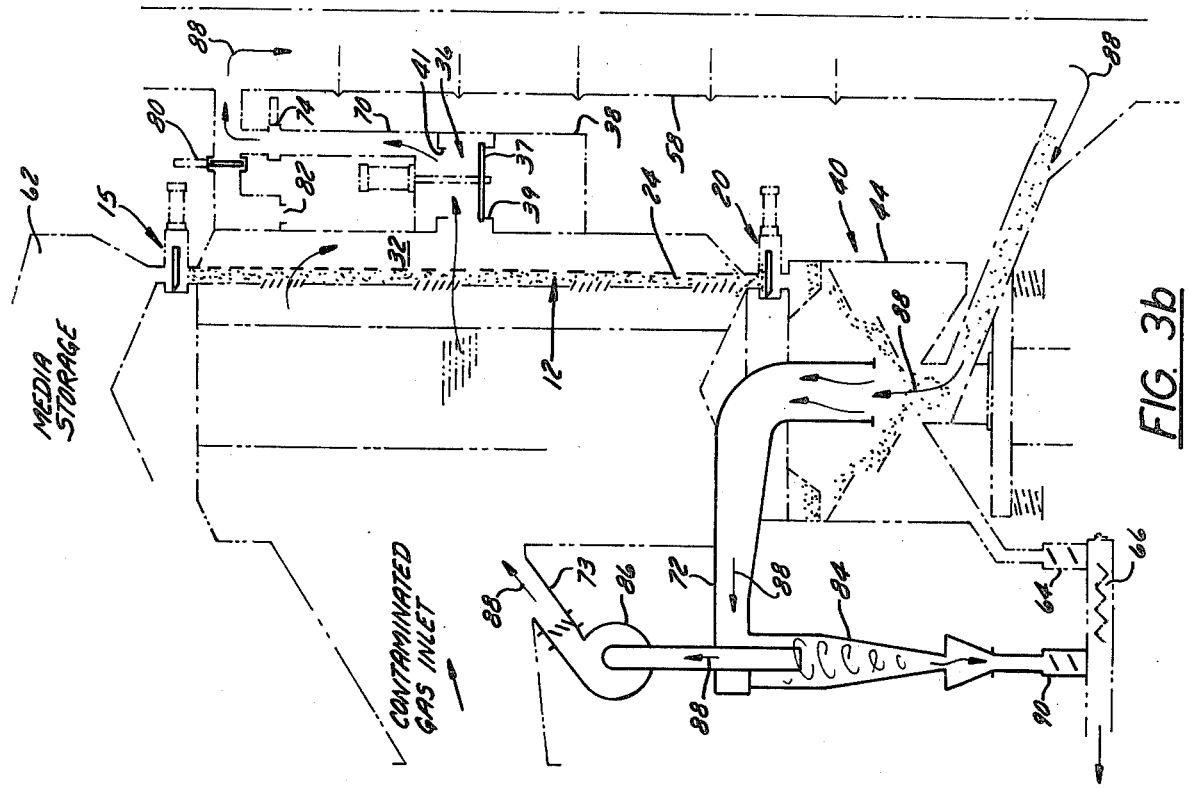
FIGS. 3a and 3b are gas flow schematic elevations of the system shown in FIG. 1 in its first and second operating modes respectively.
Figure 3A:
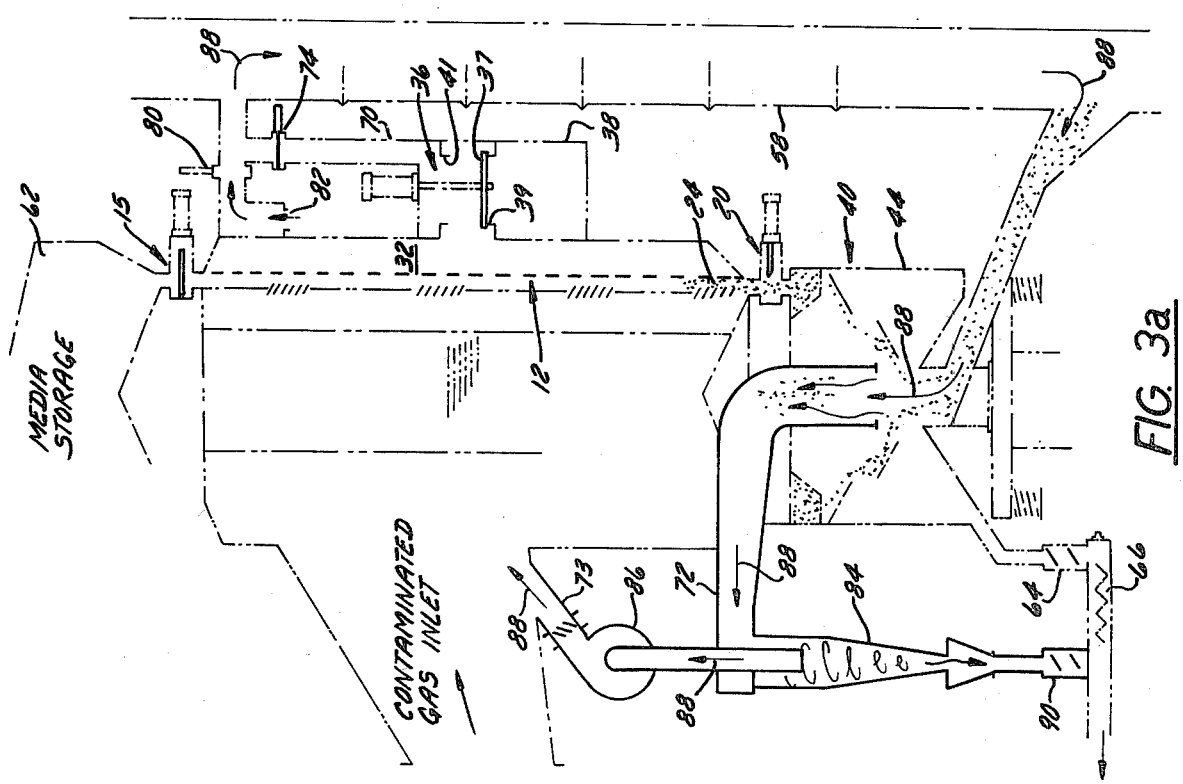

The schematic of FIGS. 3a and 3b depict the gas flow and control aspect of the invention in more detail, while some features of the filter device have been deleted or simplified. In both FIGS. 3a and 3b, pipe line 72 connects deduster 40 to a evacuation gas cleaner 84, such as a low volume high efficiency cyclone, and a low volume, high pressure draft fan 86 which is connected to the contaminated gas inlet 28 by pipe 73. Both cyclone 84 and fan 86 are commercially available components.

Referring first to FIG. 3a which depicts a first mode of the gas flow arrangement in which a single panel 12 is out of service. The OR valve 36 is shown in a position with the valve member 37 against the lower valve seat 39 to shut off gas flow to clean gas outlet 38. The upper valve seat 41 is opened to permit gas flow to the evacuation gas path. Gate 20 opens and media 24 falls into the deduster 40. Valves 74 and 80 are respectively closed and open.

For the particular panel 12 shown in FIG. 3a, no gas can pass through the panel 12 and valve 36 because the valve 74 closes the only exit through which the gas could pass. The ambient air source 82 provides air which, under the influence of fan 86, continuously circulates in the direction shown by arrows 88 which is counter to the direction of movement of the media 24. The gentle flow of air sweeps the light, airborne particles stirred up by the movement of the media and present in elevator 58 and deduster 40 into cyclone 84. Particles separated from the airstream move downward through the cyclone 84 and an airlock 90 at the bottom of the cyclone to the screw conveyor 66. The air, partially cleaned, is pumped through the fan 86 and pipeline 73 into contaminated gas inlet 28. This completes a closed cycle with respect to the residual dust.

It has been determined that the efficiency of deduster 40 is increased due to the gentle flow of air in a direction counter to the movement of the media. The airborne particles loosened by the cascading media in deduster 40 could be carried along by the media over its recirculation path. A gentle movement of air in the opposite direction militates against such an occurrence.

Figure 4A:
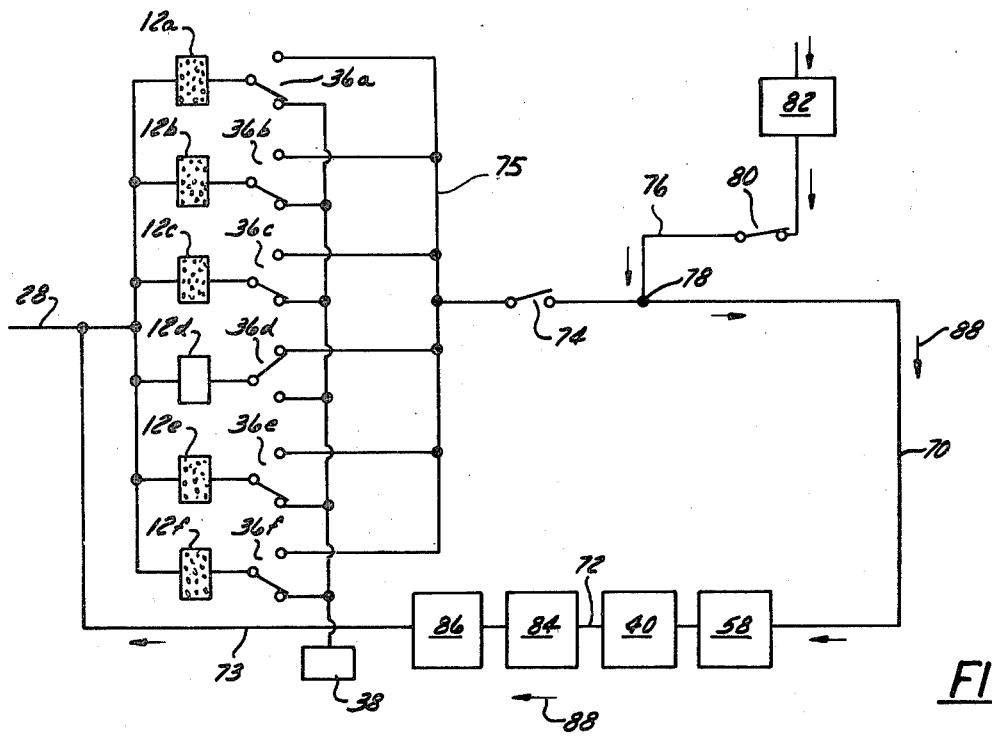
FIGS. 4a and 4b are more abstract gas flow schematic diagrams of the system shown in FIGS. 3a and 3b, respectively.

The schematic of FIG. 4a provides a simple illustration of the valve arrangement in a six panel filter when operating in the first mode described above in reference to FIG. 3a. Panel 12d corresponds to the discharged panel shown in FIG. 3a. It should be noted that all of the remaining panels 12a–c, 12e, 12f are in their operating mode with the corresponding valves directing the gas passing through each panel into clean gas outlet 38.

Figure 4B:
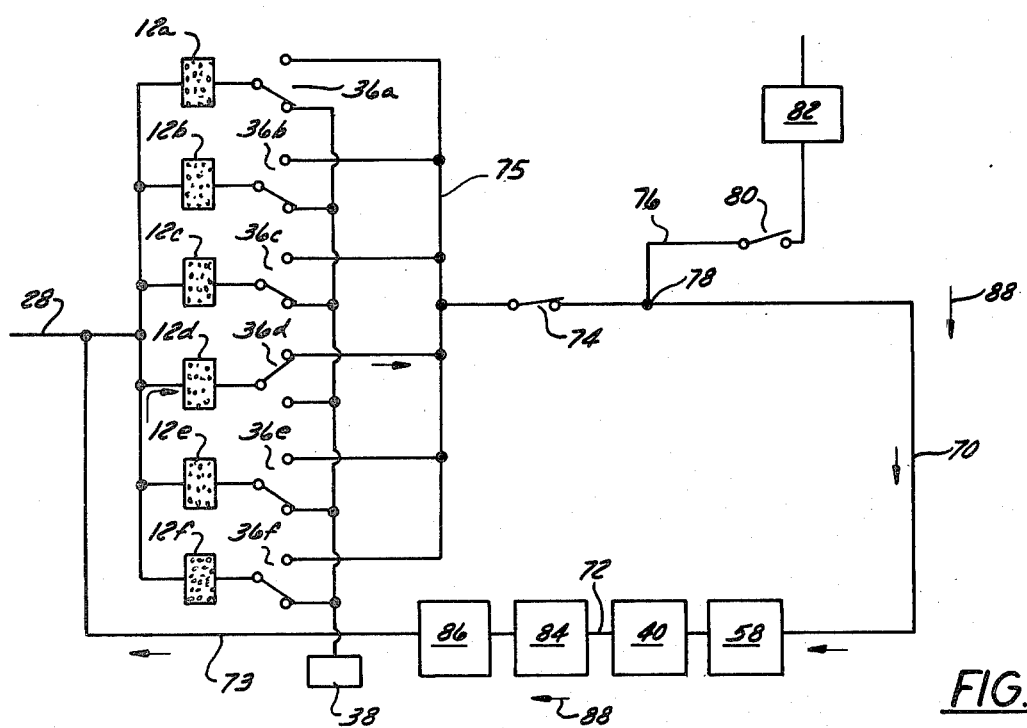

In the mode illustrated by FIG. 3b and the schematic of FIG. 4b, panel 12d has been recharged with clean media 24. The movement of the media as it was being discharged and charged does loosen a small amount of residual dust particles which drifts into the exhaust plenum 32. If the particular panel is immediately put back in operation, this small cloud of residual dust would be vented to the atmosphere. In environmental areas of extreme sensitivity, the initial vented air might contain contaminants exceeding a particular desired range.

Immediately after charging, but prior to panel 12d, for example, being placed back in service, valve 80 is closed in response to a second signal from control unit 68. To shut off the flow of ambient air into pipe 70, and valve 74 is opened also in response to a second signal from control unit 68 to permit gas flow from valve 36d through pipe 70 to the elevator 58. Thus, the cloud of residual dust in the exhaust plenum 32d is not vented directly into the clean gas outlet 38, but instead flows into the evacuation gas path denoted by arrow 88.

After a predetermined time period, valve 74 is operated to shut off the gas flow from valve 36d through pipe 70, and valve member 37d is lifted off the lower valve seat 39d and seated against the upper valve seat 41d in response to a third signal from control unit 68. This places filter panel 12d back into service. At the same time, the next filter panel in the sequence will be placed into the cleaning mode illustrated in FIGS. 3a and 4a.

In summary, the disclosed system provides an efficient granular bed filter system in which the granular material in the filter bed is held quiescent for a specified time period during filtering, removed quickly, cleaned, and returned. During the period in which the material is not in its filter bed, the gas flow arrangement operates in a first mode wherein a current of air is moved counter to the direction of movement of the media to sweep away fine contaminant particles which ordinarily would drift along with the media. Just prior to the bed being placed back in full operation for discharging clean gas to the clean gas outlet, the gas flow arrangement operates in a second mode of operation in which residual dust adjacent the bed is removed. The bed then reverts to normal filtering operation.

What is claimed is:

1. In a filter device comprised of an array of vertically disposed filter panels enclosing granular filter media, which panels define a central plenum within said array, a contaminated gas inlet communicating with the central plenum, a gas outlet communicating by way of a clean gas path with each of the panels along a surface thereof remote from the central plenum, means for discharging said media from each of said panels in a predetermined sequential order, separating means communicating with each of said panels for separating dust from the media when discharged, recirculating means communicating with said separating means for recirculating said media into said panels from which media has been discharged, an improvement which comprises:

means defining an evacuation gas path positioned and arranged with respect to the recirculating means, separating means, and contaminated gas inlet for directing gas counter to the flow of said granular filter media in said separating means and said recirculating means;

means defining a first gas path positioned and arranged with respect to said evacuation gas path and further positioned and arranged with respect to each of said panels for connecting the remote surfaces of each of said panels to said evacuation gas path in a second operating mode;

means defining a second gas path positioned and arranged with respect to said evacuation gas path for connecting a source of ambient air to said evacuation gas path in a first operating mode;

control means constructed and arranged for providing first, second and third signals;

valve means in said gas paths for controlling the gas flow therein and connected to said control means to receive said signals, said valve means being responsive to said first signal from said control means operating in said first mode for interrupting the flow of gas through one of said panels along said clean gas path to the clean gas outlet, and for opening said second gas path to a flow from the ambient air source into said evacuation gas path;

said valve means being responsive to said second signal from said control means operating in said second mode for interrupting said flow of ambient gas along said second gas path, and for opening said first gas path between the associated panel and said evacuation gas path while maintaining closed said clean gas path; and said valve means being responsive to said third signal from said control means operating in a third mode for interrupting said flows of gas along said first and second evacuation gas paths and for opening said clean gas path between the associated panel and the clean gas outlet.

2. The device of claim 1 including a gas cleaner connected to said means defining an evacuation gas path.

3. The device of claim 2, wherein said separating and recirculating means are positioned and arranged with respect to said means defining an evacuation gas path so that they are both located upstream in said evacuation gas path from said gas cleaner.

4. The device of claim 2 in which said gas cleaner includes a dust disposal outlet.

5. The device of claim 4, further comprising:
a dust disposal outlet in the bottom of said separating means; and
a dust disposal conveyor communicating with both said gas cleaner dust disposal outlet and said dedusting means dust disposal outlet for removing condensed dust from said dust disposal outlets.

6. The device of claim 1 in which said valve means includes a two position OR valve.

7. A method of cleaning the residual dust from filter panels containing granular filter media after dirty media has been removed from said panels for cleaning and replaced with clean media in a granular media gas cleaner having: a media cleaning system comprised of separating and recirculating means for periodically removing the filter media from said filter panels, and circulating the granular filter media in a certain direction through a series of steps which mechanically separate agglomerated dust from the granular filter media, and returning the granular filter media to said filter panels; inlet means for conveying dust contaminated gas into a central plenum defined by inside faces of a plurality of said filter panels containing said granular filter media; a plurality of exhaust plenums bounded in part by outside faces of said filter panels; a clean gas path for conveying clean gas from which the dust has been filtered in said filter panels from said exhaust plenums to a clean gas outlet; an evacuation gas path for conveying gas from said exhaust plenums through said media cleaning system in a direction counter to the direction of movement of said granular filter media through said media cleaning system; and an ambient gas path for conveying gas from an ambient gas source to said evacuation gas path; wherein said method comprises:

in a first mode, closing the gas flow in said clean gas path through of one of said panels, closing the gas flow in said evacuation gas path through said one panel, and opening the gas flow in said ambient gas path;

emptying the granular filter media from said one panel into said media cleaning system, and refilling said panel with clean media;

in a second mode, closing the gas flow in said ambient gas path and opening the gas flow in said evacuation gas path through said one panel;

maintaining said second mode gas flow through said one panel and said evacuation gas path open for a predetermined time period to carry away the loose dust present in said one panel into said evacuation gas path; and in an operational mode, opening said gas flow in said clean gas path through said one panel to said clean gas outlet, and closing said gas flow through said evacuation gas path.

* * * * *